(12) United States Patent
Sealey, II et al.

(10) Patent No.: US 11,486,091 B2
(45) Date of Patent: Nov. 1, 2022

(54) PAPERMAKING MACHINE THAT UTILIZES ONLY A STRUCTURED FABRIC IN THE FORMING OF PAPER

(71) Applicant: STRUCTURED I, LLC, Great Neck, NY (US)

(72) Inventors: James E. Sealey, II, Belton, SC (US); Byrd Tyler Miller, IV, Easley, SC (US); Marc Paul Begin, Simpsonville, SC (US); Theodore D. Kennedy, San Mateo, FL (US)

(73) Assignee: STRUCTURED I, LLC, Great Neck, NY (US)

( * ) Notice: Subject to any disclaimer, the term of this patent is extended or adjusted under 35 U.S.C. 154(b) by 0 days.

(21) Appl. No.: 16/895,003

(22) Filed: Jun. 8, 2020

(65) Prior Publication Data

US 2021/0032813 A1   Feb. 4, 2021

Related U.S. Application Data

(60) Provisional application No. 62/858,013, filed on Jun. 6, 2019.

(51) Int. Cl.
*D21F 1/00* (2006.01)
*D21F 3/02* (2006.01)
*B33Y 10/00* (2015.01)
*B33Y 80/00* (2015.01)

(52) U.S. Cl.
CPC .......... *D21F 1/0036* (2013.01); *D21F 3/0209* (2013.01); *B33Y 10/00* (2014.12); *B33Y 80/00* (2014.12)

(58) Field of Classification Search
CPC ........ D21F 1/0036; D21F 3/0209; D21F 9/00; D21F 1/0054; D21F 11/14; D21F 11/145; D21F 11/006; B33Y 10/00; D21H 27/02
See application file for complete search history.

(56) References Cited

U.S. PATENT DOCUMENTS

| 3,143,150 A | 8/1964 | Buchanan |
| 3,473,576 A | 10/1969 | Amneus |
| 3,573,164 A | 3/1971 | Friedberg et al. |

(Continued)

FOREIGN PATENT DOCUMENTS

| EP | 1 339 915 A2 | 9/2003 |
| WO | 2009067079 A1 | 5/2009 |

OTHER PUBLICATIONS

Communication European Search report dated Nov. 3, 2020 in connection with European Application No. 20178667.0.

(Continued)

*Primary Examiner* — Eric Hug
*Assistant Examiner* — Matthew M Eslami
(74) *Attorney, Agent, or Firm* — Amster, Rothstein & Ebenstein LLP (57) ABSTRACT

A method of forming a fibrous web on a papermaking machine including the steps of depositing a dilute fiber slurry out of a headbox to a forming area comprising a forming surface made up of a structured fabric, wherein the structured fabric is supported by a breast roll and a forming roll, and the forming area is devoid of any additional fabrics or belts other than the structured fabric, draining the dilute fiber slurry through the structured fabric, and drying the fiber slurry.

17 Claims, 3 Drawing Sheets

(56) References Cited

U.S. PATENT DOCUMENTS

| | | | |
|---|---|---|---|
| 3,905,863 | A | 9/1975 | Ayers |
| 3,974,025 | A | 8/1976 | Ayers |
| 3,994,771 | A | 11/1976 | Morgan, Jr. et al. |
| 4,102,737 | A | 7/1978 | Morton |
| 4,184,519 | A | 1/1980 | McDonald et al. |
| 4,191,609 | A | 3/1980 | Trokhan |
| 4,514,345 | A | 4/1985 | Johnson et al. |
| 4,528,239 | A | 7/1985 | Trokhan |
| 4,529,480 | A | 7/1985 | Trokhan |
| 4,637,859 | A | 1/1987 | Trokhan |
| 4,909,284 | A | 3/1990 | Kositzke |
| 5,334,289 | A | 8/1994 | Trokhan et al. |
| 5,510,002 | A | 4/1996 | Hermans et al. |
| 5,607,551 | A | 3/1997 | Farrington, Jr. et al. |
| 5,679,222 | A | 10/1997 | Rasch et al. |
| 5,806,569 | A | 9/1998 | Gulya et al. |
| 6,120,642 | A | 9/2000 | Lindsay et al. |
| 6,610,173 | B1 | 8/2003 | Lindsay et al. |
| 6,660,362 | B1 | 12/2003 | Lindsay et al. |
| 6,821,391 | B2 | 11/2004 | Scherb et al. |
| 6,878,238 | B2 | 4/2005 | Bakken et al. |
| 6,998,017 | B2 | 2/2006 | Lindsay et al. |
| 7,339,378 | B2 | 3/2008 | Han et al. |
| 7,387,706 | B2 | 6/2008 | Herman et al. |
| 7,442,278 | B2 | 10/2008 | Murray et al. |
| 7,494,563 | B2 | 2/2009 | Edwards et al. |
| 7,510,631 | B2 | 3/2009 | Scherb et al. |
| 7,582,187 | B2 | 9/2009 | Scherb et al. |
| 7,686,923 | B2 | 3/2010 | Scherb et al. |
| 7,744,726 | B2 | 6/2010 | Scherb et al. |
| 7,811,418 | B2 | 10/2010 | Klerelid et al. |
| 7,905,989 | B2 | 3/2011 | Scherb et al. |
| 7,931,781 | B2 | 4/2011 | Scherb et al. |
| 8,075,739 | B2 | 12/2011 | Scherb et al. |
| 8,092,652 | B2 | 1/2012 | Scherb et al. |
| 8,382,956 | B2 | 2/2013 | Boechat et al. |
| 8,580,083 | B2 | 11/2013 | Boechat et al. |
| 8,980,062 | B2 | 3/2015 | Karlsson et al. |
| 10,099,425 | B2 | 10/2018 | Miller, IV et al. |
| 10,208,426 | B2 | 2/2019 | Sealey et al. |
| 10,808,359 | B2 | 10/2020 | Tolfsson et al. |
| 2008/0156450 | A1 | 7/2008 | Klerelid et al. |
| 2010/0065234 | A1 | 3/2010 | Klerelid et al. |
| 2011/0180223 | A1 | 7/2011 | Klerelid et al. |
| 2017/0233946 | A1* | 8/2017 | Sealey .................... B32B 27/40 162/111 |
| 2018/0073195 | A1* | 3/2018 | Sealey .................... D21F 9/006 |

OTHER PUBLICATIONS

U.S. Appl. No. 62/897,596, filed Sep. 9, 2019.
Divisional U.S. Appl. No. 15/148,851, filed May 6, 2016.
Continuation U.S. Appl. No. 15/170,746, filed Jun. 1, 2016.
Continuation U.S. Appl. No. 15/170,760, filed Jun. 1, 2016.
Continuation U.S. Appl. No. 15/182,391, filed Jun. 14, 2016.
Continuation U.S. Appl. No. 15/443,885, filed Feb. 27, 2017.
Continuation U.S. Appl. No. 15/642,133, filed Jul. 5, 2017.
Divisional U.S. Appl. No. 15/614,156, filed Jun. 5, 2017.
Continuation U.S. Appl. No. 16/115,723, filed Aug. 29, 2018.
U.S. Appl. No. 13/837,685, filed Mar. 15, 2013.
PCT International Patent Application No. PCT/US2013/53593, filed Aug. 5, 2013.
Divisional U.S. Appl. No. 14/534,631, filed Nov. 6, 2014.
European Patent Application No. 138226461.9, filed Aug. 5, 2013.
European Patent Application No. 18183329.4, filed Aug. 5, 2013.
U.S. Appl. No. 14/951,121, filed Nov. 24, 2015.
Continuation U.S. Appl. No. 16/353,160, filed Mar. 14, 2019.
U.S. Appl. No. 62/353,160, filed Nov. 24, 2014.
PCT International Patent Application No. PCT/US2015/62483, filed Nov. 24, 2015.
European Patent Application No. 15862667.1, filed Nov. 24, 2014.
U.S. Appl. No. 14/861,249, filed Sep. 22, 2015.
Divisional U.S. Appl. No. 15/959,925, filed Apr. 23, 2018.
Continuation U.S. Appl. No. 16/862,784, filed Apr. 30, 2020.
PCT International Patent Application No. PCT/US2015/64284, filed Dec. 7, 2015.
European Patent Application No. 15865639.7, filed Dec. 7, 2015.
U.S. Appl. No. 15/431,497, filed Feb. 13, 2017.
Continuation U.S. Appl. No. 15/811,174, filed Nov. 13, 2017.
Continuation U.S. Appl. No. 16/529,905, filed Aug. 2, 2019.
Continuation U.S. Appl. No. 16/229,428, filed Dec. 21, 2018.
Continuation U.S. Appl. No. 16/229,450, filed Dec. 21, 2018.
PCT International Patent Application No. PCT/US2017/17705, filed Feb. 13, 2017.
European Patent Application No. 17750977.5, filed Feb. 13, 2017.
Chinese Application No. 201780022396.1, filed Feb. 13, 2017.
U.S. Appl. No. 15/684,731, filed Aug. 23, 2017.
Divisional U.S. Appl. No. 16/810,917, filed Mar. 6, 2020.
PCT International Patent Application No. PCT/US2018/47463, filed Aug. 22, 2015.
European Patent Application No. 18848663.3, filed Aug. 22, 2018.
U.S. Appl. No. 16/412,873, filed May 15, 2018.
U.S. Appl. No. 16/881,219, filed May 22, 2020.

* cited by examiner

PAPERMAKING MACHINE THAT UTILIZES ONLY A STRUCTURED FABRIC IN THE FORMING OF PAPER

RELATED APPLICATIONS

This application claims priority to and the benefit of U.S. Provisional Application No. 62/858,013, entitled PAPERMAKING MACHINE THAT UTILIZES ONLY A STRUCTURED FABRIC IN THE FORMING OF PAPER and filed Jun. 6, 2019, the contents of which are incorporated herein by reference in their entirety.

FIELD OF THE INVENTION

The present invention relates to systems and methods to produce an absorbent structure utilizing a papermaking machine having a structured fabric, and in particular relates to a papermaking machine that produces superior quality sanitary tissue, facial tissue, and disposable towels with less capital expenditure and continual operating costs compared to conventional systems and methods.

BACKGROUND

Tissue manufacturers that can deliver the highest quality product at the lowest cost have a competitive advantage in the marketplace. A key component in determining the cost and quality of a tissue product is the manufacturing process utilized to create the product. For tissue products, there are several manufacturing processes available including conventional dry crepe, through air drying (TAD), or "hybrid" technologies such as Valmet's NTT and QRT processes, Georgia Pacific's ETAD, and Voith's ATMOS process. Each has distinctive differences in regards to installed capital cost, raw material utilization, energy cost, production rates, and ability to generate desired quality attributes such as softness, strength, and absorbency.

Softness is the pleasing tactile sensation the consumer perceives when using the tissue product as it is moved across his or her skin or crumpled in his or her hand. Strength is the ability of a paper web to retain its physical integrity during use. Absorbency is the ability of the paper web to uptake and retain water. Tissue manufacturing processes may influence the properties of softness and absorbency. Tissue strength is influenced by the degree of cellulose fiber to fiber hydrogen bonding, ionic and covalent bonding between the cellulose fibers and polymers, web formation, and the stiffness of the fibers themselves. Tissue manufacturing processes have less differentiation in developing tissue strength.

The predominant manufacturing method for making a tissue web is the conventional dry crepe process. The process is the oldest tissue manufacturing process and is thus well understood and optimized for high production rates. The major steps of the conventional dry crepe process involve stock preparation, forming, pressing, drying, creping, calendering (optional), and reeling the web.

The first step of stock preparation involves selection, blending, mixing, and preparation of the proper ratio of wood, plant, or synthetic fibers along with chemistry and fillers that are needed in the specific tissue grade. This mixture is diluted to over 99% water in order to allow for even fiber formation when deposited from the machine headbox into the forming section. There are many types of forming sections used in conventional papermaking (inclined suction breast roll, twin wire C-wrap, twin wire S-wrap, suction forming roll, and Crescent formers) but all are designed to retain the fiber, chemical, and filler recipe while allowing the water to drain from the web. Fabrics are used to achieve these tasks.

Forming fabrics are woven structures that utilize monofilaments (yarns, threads) composed of synthetic polymers (usually polyethylene, polypropylene, or nylon). The forming fabric has two surfaces: a sheet side and a machine or wear side. The wear side is in contact with the elements that support and move the fabric and are thus prone to wear. To increase wear resistance and improve drainage, the wear side of the fabric has larger diameter monofilaments compared to the sheet side. The sheet side has finer yarns to promote fiber and filler retention on the fabric surface.

In order to control other properties such as fabric stability, life potential, drainage, fiber support, and clean-ability, different weave patterns are utilized. Generally, forming fabrics are classified by the number of layers utilized in their construction. There are three basic styles of forming fabrics: single layer, double layer, and triple layer. A single layer fabric is composed of one cross direction ("CD" or shute) and one machine direction ("MD" or warp) yarn system. The main problem of single layer fabrics is lack of dimensional stability. The double layer forming fabric has one layer of warp yarns and two layers of shute yarns. This multilayer fabric is generally more stable and resistant to stretching. Triple layer fabrics have two separate single layer fabrics bound together by separated yarns called binders. Usually the binder fibers are placed in cross direction but also can be oriented in the machine direction. Triple layer fabrics have further increased dimensional stability, wear potential, drainage, and fiber support than single or double-layer fabrics.

The manufacturing of forming fabrics includes the following operations: weaving, initial heat setting, seaming, final heat setting, and finishing. The fabric is made in a loom using two interlacing sets of monofilaments (or threads or yarns). The longitudinal threads are called warp threads and the transverse called shute threads. After weaving, the forming fabric is heated to relieve internal stresses to enhance dimensional stability of the fabric. The next step in manufacturing is seaming. This step converts the flat woven fabric into an endless forming fabric by joining the two MD ends of the fabric. After seaming, the final heat setting is applied to stabilize and relieve the stresses in the seam area. The final step in the manufacturing process is finishing, where the fabric is cut to width and sealed.

There are several parameters and tools used to characterize the properties of the forming fabric, including mesh and count, caliper, frames, plane difference, open area, air permeability, void volume and distribution, running attitude, fiber support, drainage index, and stacking. None of these parameters can be used individually to precisely predict the performance of a forming fabric on a paper machine, but together the expected performance and sheet properties can be estimated. U.S. Pat. Nos. 2,903,021, 3,143,150, 4,184,519, 4,909,284, and 5,806,569 provide examples of forming fabric designs.

After web formation and drainage (to around 35% solids) in the forming section (assisted by centripetal force around the forming roll, and vacuum boxes in several former types), the web is transferred to a press fabric upon which the web is pressed between a rubber or polyurethane covered suction pressure roll and a Yankee dryer. The press fabric is a permeable fabric designed to uptake water from the web as it is pressed in the press section. It is composed of large monofilaments or multi-filamentous yarns, needled with fine synthetic batt fibers to form a smooth surface for even web pressing against the Yankee dryer. Removing water via pressing results in low energy consumption.

After pressing the sheet between a suction pressure roll and a steam heated cylinder (referred to as a Yankee dryer), the web is dried from up to 50% solids to up to 99% solids using the steam heated cylinder and hot air impingement from an air system (air cap or hood) installed over the steam cylinder. The sheet is then creped from the steam cylinder using a steel or ceramic doctor blade. This is an important step in the conventional dry crepe process. The creping process greatly affects softness, as the surface topography is dominated by the number and coarseness of the crepe bars (finer crepe is much smoother than coarse crepe). Some thickness and flexibility are also generated during the creping process. If the process is a wet crepe process, the web must be conveyed between dryer fabrics through steam heated after-dryer cans to dry the web to the required finished moisture content. After creping, the web is optionally calendered and reeled into a parent roll and ready for the converting process.

The absorbency of a conventional tissue web is low due to the web being pressed. This results in a low bulk, low void volume web where there is little space for water to be absorbed. Additionally, bulk generated by creping is lost when the web is wetted, further reducing bulk and void volume.

The through air dried (TAD) process is another manufacturing method for making a tissue web. The major steps of the through air dried process are stock preparation, forming, imprinting, thermal pre-drying, drying, creping, calendering (optional), and reeling the web. The stock preparation and forming steps are similar to conventional dry creping.

Rather than pressing and compacting the web, as is performed in conventional dry crepe, the web undergoes the steps of imprinting and thermal pre-drying. Imprinting is a step in the process where the web is transferred from a forming fabric to a structured fabric (or imprinting fabric) and subsequently pulled into the structured fabric using vacuum (referred to as imprinting or molding). This step imprints the weave pattern (or knuckle pattern) of the structured fabric into the web. This imprinting step has a tremendous effect on the softness of the web, both affecting smoothness and the bulk structure. The design parameters of the structured fabric (weave pattern, mesh, count, warp and weft monofilament diameters, caliper, air permeability, and optional over-laid polymer) are therefore critical to the development of web softness. The manufacturing method of an imprinting fabric is similar to a forming fabric (see, for example, U.S. Pat. Nos. 3,473,576, 3,573,164, 3,905,863, 3,974,025, and 4,191,609), except for an additional step involving the use of an overlaid polymer. These types of fabrics are disclosed in, for example, U.S. Pat. Nos. 5,679, 222 4,514,345, 5,334,289, 4,528,239 and 4,637,859. Fabrics produced using these methods result in a fabric with a patterned resin applied over a woven substrate. The benefit is that resulting patterns are not limited by a woven structure and can be created in any desired shape to enable a higher level of control of the web structure and topography that dictate web quality properties.

After imprinting, the web is thermally pre-dried by moving hot air through the web while it is conveyed on the structured fabric. Thermal pre-drying can be used to dry the web to over 90% solids before it is transferred to a steam heated cylinder. The web is then transferred from the structured fabric to the steam heated cylinder through a very low intensity nip (up to 10 times less than a conventional press nip) between a solid pressure roll and the steam heated cylinder. The only portions of the web that are pressed between the pressure roll and steam cylinder rest on knuckles of the structured fabric, thereby protecting most of the web from the light compaction that occurs in this nip. The steam cylinder and an optional air cap system for impinging hot air then dry the sheet to up to 99% solids during the drying stage before creping occurs. The creping step of the process again only affects the knuckle sections of the web that are in contact with the steam cylinder surface. Due to only the knuckles of the web being creped, along with the dominant surface topography being generated by the structured fabric, and the higher thickness of the TAD web, the creping process has a much smaller effect on overall softness as compared to conventional dry crepe. After creping, the web is optionally calendered and reeled into a parent roll and ready for the converting process. Some TAD machines utilize fabrics (similar to dryer fabrics) to support the sheet from the crepe blade to the reel drum, to aid in sheet stability and productivity. Patents which describe creped through air dried products include U.S. Pat. Nos. 3,994,771, 4,102,737, 4,529,480, and 5,510,002.

The TAD process is generally higher in capital costs than a conventional tissue machine due to the amount of air handling equipment needed for the TAD section, with higher energy consumption due to the need to burn natural gas or other fuels for thermal pre-drying. The bulk softness and absorbency is superior to conventional paper due to the superior bulk generation via structured fabrics, which creates a low density, high void volume web that retains its bulk when wetted. The surface smoothness of a TAD web can approach that of a conventional tissue web. The productivity of a TAD machine is less than that of a conventional tissue machine due to the complexity of the process and especially the difficulty providing a robust and stable coating package on the Yankee dryer needed for transfer and creping of a delicate pre-dried web.

A variation of the TAD process where the sheet is not creped, but rather dried to up to 99% using thermal drying and blown off the structured fabric (using air) to be optionally calendered and reeled also exits. This process is called UCTAD or un-creped through air drying process. U.S. Pat. No. 5,607,551 discloses an uncreped through air dried process.

A new process/method and paper machine system for producing tissue has been developed by the Voith company and is being marketed under the name ATMOS. The process/method and paper machine system has several patented variations, but all involve the use of a structured fabric in conjunction with a belt press. The major steps of the ATMOS process and its variations are stock preparation, forming, imprinting, pressing (using a belt press), creping, calendering (optional), and reeling the web.

The stock preparation step is the same as that used in a conventional or TAD machine. The purpose is to prepare the proper recipe of fibers, chemical polymers, and additives that are necessary for the grade of tissue being produced, and diluting this slurry to allow for proper web formation when deposited out of the machine headbox (single, double, or triple layered) to the forming surface. The forming process can utilize a twin wire former (as described in U.S. Pat. No. 7,744,726) a Crescent Former with a suction Forming Roll (as described in U.S. Pat. No. 6,821,391), or preferably a Crescent Former (as described in U.S. Pat. No. 7,387,706). The preferred former is provided a slurry from the headbox to a nip formed by a structured fabric (inner position/in contact with the forming roll) and forming fabric (outer position). The fibers from the slurry are predominately collected in the valleys (or pockets, pillows) of the structured fabric and the web is dewatered through the forming fabric. This method for forming the web results in a unique bulk structure and surface topography as described in U.S. Pat. No. 7,387,706 (FIG. 1 through FIG. 11). The fabrics separate after the forming roll with the web staying in contact with the structured fabric. At this stage, the web is already imprinted by the structured fabric, but utilization of a vacuum box on the inside of the structured fabric can facilitate further fiber penetration into the structured fabric and a deeper imprint.

The web is now transported on the structured fabric to a belt press. The belt press can have multiple configurations. The first patented belt press configurations used in conjunction with a structured fabric can be viewed in U.S. Pat. No. 7,351,307 (FIG. 13), where the web is pressed against a dewatering fabric across a vacuum roll by an extended nip belt press. The press dewaters the web while protecting the areas of the sheet within the structured fabric valleys from compaction. Moisture is pressed out of the web, through the dewatering fabric, and into the vacuum roll. The press belt is permeable and allows for air to pass through the belt, web, and dewatering fabric, and into the vacuum roll, thereby enhancing the moisture removal. Since both the belt and dewatering fabric are permeable, a hot air hood can be placed inside of the belt press to further enhance moisture removal as shown in FIG. 14 of U.S. Pat. No. 7,351,307. Alternately, the belt press can have a pressing device arranged within the belt which includes several press shoes, with individual actuators to control cross direction moisture profile (see FIG. 28 of U.S. Pat. No. 7,951,269 or 8,118,979 or FIG. 20 of U.S. Pat. No. 8,440,055) or a press roll (see FIG. 29 of U.S. Pat. No. 7,951,269 or 8,118,979 or FIG. 21 of U.S. Pat. No. 8,440,055). The preferred arrangement of the belt press has the web pressed against a permeable dewatering fabric across a vacuum roll by a permeable extended nip belt press. Inside the belt press is a hot air hood that includes a steam shower to enhance moisture removal. The hot air hood apparatus over the belt press can be made more energy efficient by reusing a portion of heated exhaust air from the Yankee air cap or recirculating a portion of the exhaust air from the hot air apparatus itself (see U.S. Pat. No. 8,196,314). Further embodiments of the drying system composed of the hot air apparatus and steam shower in the belt press section are described in U.S. Pat. Nos. 8,402,673, 8,435,384 and 8,544,184.

After the belt press is a second press to nip the web between the structured fabric and dewatering felt by one hard and one soft roll. The press roll under the dewatering fabric can be supplied with vacuum to further assist water removal. This preferred belt press arrangement is described in U.S. Pat. Nos. 8,382,956, and 8,580,083, with FIG. 1 showing the arrangement. Rather than sending the web through a second press after the belt press, the web can travel through a boost dryer (FIG. 15 of U.S. Pat. No. 7,387,706 or 7,351,307), a high pressure through air dryer (FIG. 16 of U.S. Pat. No. 7,387,706 or 7,351,307), a two pass high pressure through air dryer (FIG. 17 of U.S. Pat. No. 7,387, 706 or 7,351,307) or a vacuum box with hot air supply hood (FIG. 2 of U.S. Pat. No. 7,476,293). U.S. Pat. Nos. 7,510, 631, 7,686,923, 7,931,781 8,075,739, and 8,092,652 further describe methods and systems for using a belt press and structured fabric to make tissue products each having variations in fabric designs, nip pressures, dwell times, etc. and are mentioned here for reference. A wire turning roll can be also be utilized with vacuum before the sheet is transferred to a steam heated cylinder via a pressure roll nip (see FIG. 2a of U.S. Pat. No. 7,476,293).

The sheet is now transferred to a steam heated cylinder via a press element. The press element can be a through drilled (bored) pressure roll (FIG. 8 of U.S. Pat. No. 8,303,773), a through drilled (bored) and blind drilled (blind bored) pressure roll (FIG. 9 of U.S. Pat. No. 8,303,773), or a shoe press (see U.S. Pat. No. 7,905,989). After the web leaves this press element to the steam heated cylinder, the % solids are in the range of 40-50% solids. The steam heated cylinder is coated with chemistry to aid in sticking the sheet to the cylinder at the press element nip and to also aid in removal of the sheet at the doctor blade. The sheet is dried to up to 99% solids by the steam heated cylinder and installed hot air impingement hood over the cylinder. This drying process, the coating of the cylinder with chemistry, and the removal of the web with doctoring is explained in U.S. Pat. Nos. 7,582,187 and 7,905,989. The doctoring of the sheet off the Yankee, creping, is similar to that of TAD with only the knuckle sections of the web being creped. Thus the dominant surface topography is generated by the structured fabric, with the creping process having a much smaller effect on overall softness as compared to conventional dry crepe. The web is then calendered (optional,) slit, and reeled and ready for the converting process.

The ATMOS process has capital costs between that of a conventional tissue machine and TAD machine. It has more fabrics and a more complex drying system compared to a conventional machine, but less equipment than a TAD machine. The energy costs are also between that of a conventional and TAD machine due to the energy efficient hot air hood and belt press. The productivity of the ATMOS machine has been limited due to the ability of the novel belt press and hood to dewater the web and poor web transfer to the Yankee dryer, likely driven by poor supported coating packages, the inability of the process to utilize structured fabric release chemistry, and the inability to utilize overlaid fabrics to increase web contact area to the dryer. Poor adhesion of the web to the Yankee dryer has resulted in poor creping and stretch development which contributes to sheet handling issues in the reel section. The result is that the production of an ATMOS machine is currently below that of a conventional and TAD machine. The bulk softness and absorbency is superior to conventional, but lower than a TAD web since some compaction of the sheet occurs within the belt press, especially areas of the web not protected within the pockets of the fabric. Also, bulk is limited since there is no speed differential to help drive the web into the structured fabric as exists on a TAD machine. This severely limits the ability to produce a bulky, absorbent paper towel. The surface smoothness of an ATMOS web is between that of a TAD web and conventional web primarily due to the current limitation on use of overlaid structured fabrics.

The ATMOS manufacturing technique is often described as a hybrid technology because it utilizes a structured fabric like the TAD process, but also utilizes energy efficient means to dewater the sheet like the Conventional Dry Crepe process. Other manufacturing techniques which employ the use of a structured fabric along with an energy efficient dewatering process are the ETAD process and NTT process.

The ETAD process and products can be viewed in U.S. Pat. Nos. 7,339,378, 7,442,278, and 7,494,563. This process can utilize any type of former such as a Twin Wire Former or Crescent Former. After formation and initial drainage in the forming section, the web is transferred to a press fabric where it is conveyed across a suction vacuum roll for water removal, increasing web solids up to 25%. Then the web travels into a nip formed by a shoe press and backing/transfer roll for further water removal, increasing web solids up to 50%. At this nip, the web is transferred onto the transfer roll and then onto a structured fabric via a nip formed by the transfer roll and a creping roll. At this transfer point, speed differential can be utilized to facilitate fiber penetration into the structured fabric and build web caliper. The web then travels across a molding box to further enhance fiber penetration if needed. The web is then transferred to a Yankee dryer where it can be optionally dried with a hot air impingement hood, creped, calendared, and reeled.

The ETAD process to date has been reported to have severe productivity, quality, and cost problems. Poor energy efficiency has been reported, bulk has been difficult to generate (likely due to high web dryness at the point of transfer to the structured fabric), and softness has been poor (coarse fabrics have been utilized to generate target bulk, thereby decreasing surface smoothness). Absorbency is better than ATMOS due to the ability to utilize speed differential to build higher bulk, but it is still below that of TAD which can create higher bulk with limited web compaction that would otherwise reduce void volume and thus absorbency. The installed costs of an ETAD machine are likely close to that of a TAD machine due to the large amount of fabrics and necessary supporting equipment.

The NTT process and products can be viewed in international patent application publication WO 2009/061079 A1, and U.S. Patent Application Publication Nos. US 2011/0180223 A1 and US 2010/0065234 A1. The process has several embodiments, but the key step is the pressing of the web in a nip formed between a structured fabric and press felt. The web contacting surface of the structured fabric is a non-woven material with a three dimensional structured surface comprised of elevations and depressions of a predetermined size and depth. As the web is passed through this nip, the web is formed into the depression of the structured fabric since the press fabric is flexible and will reach down into all of the depressions during the pressing process. When the felt reaches the bottom of the depression, hydraulic force is built up which forces water from the web and into the press felt. To limit compaction of the web, the press rolls will have a long nip width which can be accomplished if one of the rolls is a shoe press. After pressing, the web travels with the structured fabric to a nip with the Yankee dryer, where the sheet is optionally dried with a hot air impingement hood, creped, calendared, and reeled.

The NTT process has low capital costs, equal or slightly higher than a conventional tissue machine. It has high production rates (equal or slightly less than a conventional machine) due to the simplicity of design, the high degree of dewatering of the web at the shoe press, and the novelty of construction of the structured fabric. The structured fabric, which will be described later in this document, provides a smooth surface with high contact area to the dryer for efficient web transfer. This high contact area and smooth surface makes the Yankee coating package much easier to manage and creates conditions beneficial for fine creping, resulting in good sheet handling in the reel section. The bulk softness of the NTT web is not equal to the ATMOS sheet as the web is highly compacted inside the structured fabric by the press felt compared to the ATMOS web. The surface smoothness is better than an ATMOS web due to the structured fabric design providing for better creping conditions. The NTT process also does not have a speed differential into the structured fabric so the bulk and absorbency remains below the potential of the TAD and ETAD processes.

The QRT process is disclosed in US 2008/0156450 A1 and U.S. Pat. No. 7,811,418. The process can utilize a twin wire former to form the web which is then transferred to a press fabric or directly formed onto a press fabric using an inverted Crescent former. The web can be dewatered across a suction turning roll in the press section before being pressed in an extended nip between the press fabric and a plain transfer belt. A rush transfer nip is utilized to transfer the web to a structured fabric in order to build bulk and mold the web before the web is transferred to the Yankee dryer and creped. This process alleviates the NTT design deficiency which lacks a rush transfer or speed differential to force the web into the structured fabric to build bulk. However, the costs, complexity, and likely productivity will be negatively affected.

The preferred manufacturing process for structuring belts used in the NTT, QRT, and ETAD imprinting processes can be viewed in U.S. Pat. No. 8,980,062 and U.S. Patent Application Publication No. 2010/0236034. The process involves spirally winding strips of polymeric material, such as industrial strapping or ribbon material, and adjoining the sides of the strips of material using ultrasonic, infrared, or laser welding techniques to produce an endless belt. Optionally, a filler or gap material can be placed between the strips of material and melted using the aforementioned welding techniques to join the strips of materials. The strips of polymeric material are produced by an extrusion process from any polymeric resin such as polyester, polyamide, polyurethane, polypropylene, or polyether ether ketone resins. The strip material can also be reinforced by incorporating monofilaments of polymeric material into the strips during the extrusion process or by laminating a layer of woven polymer monofilaments to the non-sheet contacting surface of a finished endless belt composed of welded strip material. The endless belt can have a textured surface produced using processes such as sanding, graving, embossing, or etching. The belt can be impermeable to air and water, or made permeable by processes such as punching, drilling, or laser drilling. Examples of structuring belts used in the NTT process can be viewed in International Publication Number WO 2009/067079 A1 and U.S. Patent Application Publication No. 2010/0065234 A1.

As shown in the aforementioned discussion of tissue papermaking technologies, the fabrics or belts are important in the development of the tissue web structure and topography, which are instrumental in the quality characteristics of the web such as softness (bulk softness and surfaces smoothness) and absorbency. The manufacturing process for making these fabrics has been limited to weaving a fabric (primarily forming fabrics and imprinting/structured fabrics) or a base structure upon which synthetic fibers are needled (press fabrics) or overlaid with a polymeric resin (overlaid imprinting/structured fabrics), or welding strips of polymeric material together to form an endless belt. Known methods of making a structured fabric involve overlaying processes or welding polymeric strips. An alternate process for producing superior structured fabrics is disclosed in U.S. Pat. No. 10,208,426. All of these structured or imprinting fabrics are used with a second fabric, necessitating complexity in machine design and additional cost for the second fabric. The need for multiple belts results in additional cost in terms of the belts themselves, maintenance and replacement of the belts, and large facilities to house the papermaking machines. Accordingly, there is a need for a papermaking process with improved efficiency and reduced cost.

All of the patents and patent applications discussed in the present application are incorporated herein by reference in their entirety.

SUMMMARY OF THE INVENTION

A method of forming a fibrous web on a papermaking machine according to an exemplary embodiment of the present invention comprises: depositing a dilute fiber slurry out of a headbox to a forming area so as to form a nascent web, the forming area comprising a forming surface made up of a structured fabric, wherein the structured fabric is supported by a breast roll and a forming roll, and the forming area is devoid of any fabrics or belts other than the structured fabric; draining the nascent web through the structured fabric; and drying the nascent web.

In exemplary embodiments, the structured fabric comprises a woven structure comprising monofilaments of synthetic polymers.

In exemplary embodiments, the structured fabric comprises a woven structure comprising monofilaments of synthetic polymers and an overlaid resin.

In exemplary embodiments, the structured fabric is made using a 3-D printing process.

In exemplary embodiments, the 3-D printing process is of a type selected from the group consisting of fused deposition modeling, PolyJet Technology, selective laser melting, direct metal laser sintering, selective laser sintering, stereolithography, and laminated object manufacturing.

In exemplary embodiments, the structured fabric comprises a woven structure comprising monofilaments of synthetic polymers that are laminated with strips of polymeric material of a type selected from the group consisting of industrial strapping and ribbon material, connected by a technique of a type selected from the group consisting of ultrasonic, infrared, and laser welding techniques, wherein the fabric comprises openings produced by a process of a type selected from the group consisting of punching, drilling, and laser drilling.

In exemplary embodiments, the structured fabric comprises a woven structure comprising monofilaments of synthetic polymers laminated with extruded netting tube made of a nonwoven polymer that has been stretched to orient the polymer.

In exemplary embodiments, the headbox is of a type selected from the group consisting of a single layer headbox, a double layer headbox, and a triple layer headbox.

In exemplary embodiments, the fibers are of a type selected from the group consisting of natural, synthetic, and combinations thereof.

In exemplary embodiments, the method further comprises releasing the nascent web from the forming roll with a vacuum box on a non-web contacting surface of the structured fabric to adhere the web to the structured fabric during nip exit.

In exemplary embodiments, the method further comprises vacuum assisted dewatering with vacuum boxes on a non-web contacting surface of the structured fabric.

In exemplary embodiments, drying the web comprises a technique of a type selected from the group consisting of: drying the web using a belt press with a hot air impingement hood; drying the web using one or more through air drying cylinders with associated air recirculation systems; drying the web using one or more pressure rolls and one or more steam heated cylinders; and combinations thereof.

In exemplary embodiments, the web is dried using a steam heated cylinder, and the method further comprises creping the web from the steam heated cylinder.

In exemplary embodiments, the method further comprises calendering and reeling the web.

In exemplary embodiments, the method further comprises removing the web from the structured fabric utilizing a roll with an internal air shower and through drilled roll cover.

A papermaking machine according to an exemplary embodiment of the present invention comprises: a forming section in which is formed a nascent fibrous web, the forming section comprising a nip between two rolls and a single fabric that is a structured fabric, the structured fabric configured to receive a fiber slurry deposited from a headbox so as to form the nascent web; a predrying section into which the nascent web travels on the structured fabric after separation of the structured fabric from the forming roll; and a dry end section after the predrying section through which the nascent web travels after being transferred from the structured fabric, wherein the papermaking machine is devoid of any belts or fabrics other than the structured fabric.

In exemplary embodiments, the papermaking machine further comprises a drying section to which the nascent web travels on the structured fabric prior to transferring of the nascent web to the dry end section.

In exemplary embodiments, the structured fabric comprises a woven fabric, a woven fabric with an overlaid polymer, welded strips of polymeric material or extruded sheets of polymer which are etched by punching, drilling, or laser drilling, woven fabrics laminated with a 3-D printed web contacting or structuring layer, a structured fabric made entirely from 3-D printed material, a laminated structured fabric with a web-contacting layer made from extruded polymer netting or 3-D printed material laminated to a woven fabric or dewatering fabric.

In exemplary embodiments, the structured fabric comprises a laminated fabric that comprises: a web contacting layer made from extruded polymer netting or 3-D printed material; and a non-web contacting layer made of a woven fabric.

In exemplary embodiments, the headbox is a single, double, or triple layer headbox.

In exemplary embodiments, the headbox comprises dilution water actuators for controlling cross machine direction basis weight.

In exemplary embodiments, the two rolls comprise a forming roll and a breast roll, and the forming roll is impermeable or permeable with an internal vacuum box comprised of a smooth or textured roll cover made of a material selected from the group consisting of rubber, polyurethane, filaments made of metal or polymer, or combinations thereof.

In exemplary embodiments, the predrying section comprises one or more vacuum dewatering boxes, one or more vacuum dewatering shoes, one or more steamboxes, one or more TAD drums with hot air impingement hoods, or combinations thereof.

In exemplary embodiments, the predrying section comprises a scanner to measure cross direction web moisture and control profiling actuators of the steambox.

In exemplary embodiments, the predrying section comprises a press element.

In exemplary embodiments, the predrying section comprises a vacuum roll disposed at a web contacting surface of the structuring fabric that conveys the web to the dry end section.

In exemplary embodiments, the predrying section comprises a suction pressure roll, and the suction pressure roll comprises a roll cover made of a polymeric material and the roll cover is grooved, blind drilled, through drilled, or a combination thereof.

In exemplary embodiments, the predrying section comprises a shoe press, and the shoe press comprises a sleeve made of a polymeric material and the sleeve is grooved, blind drilled, through drilled, or a combination thereof.

In exemplary embodiments, the predrying section comprises a chemical shower at the nip between the press element and a steam heated cylinder of the drying section for applying a chemical to aid in paper web transfer to the steam heated cylinder.

In exemplary embodiments, the drying section comprises a steam heated cylinder and creping doctor with or without a hot air impingement hood.

In exemplary embodiments, the dry end section comprises calenders, a scanner, and a reeling device.

In exemplary embodiments, the scanner measures cross direction machine basis weight profile and controls dilution actuators of the headbox for an even basis weight profile.

A papermaking machine according to an exemplary embodiment of the present invention comprises: a forming section in which is formed a nascent fibrous web, the forming section comprising a nip between two rolls and a structured fabric, the structured fabric configured to receive a fiber slurry deposited from a headbox so as to form the nascent web, the forming section being devoid of any fabrics or belts other than the structured fabric; a dewatering or press section into which the nascent web travels on the structured fabric after separation of the structured fabric from the forming roll; and a dry end section after the dewatering or press section through which the nascent web travels after being transferred from the structuring fabric.

In exemplary embodiments, the papermaking machine further comprises a drying section to which the nascent web travels on the structured fabric prior to transfer of the nascent web to the dry end section.

In exemplary embodiments, the structured fabric comprises a woven fabric, a woven fabric with an overlaid polymer, welded strips of polymeric material or extruded sheets of polymer which are etched by punching, drilling, or laser drilling, woven fabrics laminated with a 3-D printed web contacting or structuring layer, a structured fabric made entirely from 3-D printed material, a laminated structured fabric with a web-contacting layer made from extruded polymer netting or 3-D printed material laminated to a woven fabric or dewatering fabric.

In exemplary embodiments, the structured fabric comprises a laminated fabric that comprises: a web contacting layer made from extruded polymer netting or 3-D printed material; and a non-web contacting layer made of a woven fabric.

In exemplary embodiments, the headbox is a single, double, or triple layer headbox.

In exemplary embodiments, the headbox comprises dilution water actuators for controlling cross machine direction basis weight.

In exemplary embodiments, the forming roll is impermeable or permeable with an internal vacuum box and a smooth or textured roll cover made of a material selected from the group consisting of rubber, polyurethane, filaments made of metal or polymer, or combinations thereof.

In exemplary embodiments, the press section comprises vacuum elements.

In exemplary embodiments, the press section comprises an extended nip press and a suction element forming a nip through which the nascent web being transferred on a structuring fabric is pressed between two dewatering fabrics.

In exemplary embodiments, at least one of the dewatering fabrics comprises polymer monofilaments or multi-filamentous yarns, needled with fine synthetic batt fibers.

In exemplary embodiments, absorbent porous materials are incorporated into at least one of the dewatering fabrics.

In exemplary embodiments, extruded polymer netting is added to at least one of the dewatering fabrics for compression resistance.

In exemplary embodiments, the extended nip press is a shoe press or belt press.

In exemplary embodiments, a sleeve of the extended nip press is plain grooved, blind drilled, through drilled, or a combination thereof.

In exemplary embodiments, the suction element is a suction pressure roll.

In exemplary embodiments, the suction pressure roll comprises a cover made of a polymeric material and the cover is grooved, blind drilled, through drilled, or a combination thereof.

In exemplary embodiments, the suction element is a vacuum box or suction pickup shoe.

In exemplary embodiments, the papermaking machine comprises cleaning modules configured to clean the dewatering fabrics, and the cleaning modules are of a type selected from the group consisting of high-pressure fan or needle showers and uhle boxes.

In exemplary embodiments, the press section comprises a second press nip comprised of a press element around which one of the two dewatering fabric runs and upon which the structuring fabric conveying the web is nipped to a steam heated cylinder.

In exemplary embodiments, the press element comprises a shoe press, a suction pressure roll, or plain press roll.

In exemplary embodiments, the press element is a shoe press, and the shoe press comprises a sleeve that is plain, grooved, blind drilled, through drilled, or a combination thereof.

In exemplary embodiments, the press element is a suction pressure roll, and the suction pressure roll comprises a roll cover made of a polymeric material and the roll cover is grooved, blind drilled, through drilled, or a combination thereof.

In exemplary embodiments, the second press nip comprises a chemical shower at the nip between the dewatering fabric and the structuring fabric for applying a chemical to aid in paper web transfer to the steam heated cylinder.

In exemplary embodiments, the dry end section comprises a steam heated cylinder and creping doctor with or without a hot air impingement hood.

In exemplary embodiments, the dry end section comprises calendars, a scanner, and a reeling device.

In exemplary embodiments, the scanner is configured to measure cross direction machine basis weight profile to control dilution actuators of the headbox for an even basis weight profile.

In exemplary embodiments, a scanner is located between the first and second press nip along the structured fabric to measure moisture in the web and control actuators of a steambox located in the press section.

In exemplary embodiments, the papermaking machine further comprises cleaning modules configured to clean the structured fabric, wherein the cleaning modules are of a type selected from the group consisting of high-pressure fan or needle showers and uhle boxes.

In exemplary embodiments, the papermaking machine further comprises cleaning modules configured to clean the structured fabric, wherein the cleaning modules are of a type selected from the group consisting of high-pressure fan or needle showers and uhle boxes.

In exemplary embodiments, the press section contains a second press nip comprised of a press element around which a structuring fabric conveying the web is nipped to a steam heated cylinder.

In exemplary embodiments, the press element of the second press nip comprises a shoe press, a suction pressure roll with at least one of an internal vacuum box or a pressurized box, or plain press roll.

In exemplary embodiments, a sleeve of the press element is plain, grooved, blind drilled, through drilled, or a combination thereof.

In exemplary embodiments, a roll cover of the press element is made of a polymeric material and the cover of the press is grooved, blind drilled, through drilled, or a combination thereof.

In exemplary embodiments, the second press nip comprises a chemical shower at the nip between the structured fabric and press element for applying a chemical to aid in paper web transfer to the steam heated cylinder.

DETAILED DESCRIPTION

A method of forming a fibrous web on a papermaking machine according to an exemplary embodiment of the present invention includes the steps of depositing a dilute fiber slurry out of a headbox to a forming area that includes a forming surface made up of a structured fabric, wherein the structured fabric is supported by a breast roll and a forming roll, and the forming area is devoid of any fabric or belt other than the structured fabric, draining the dilute fiber slurry through the structured fabric, and drying the drained fiber slurry. In exemplary embodiments, the structured fabric is of the kind described in U.S. Pat. No. 10,208,426 or U.S. patent application Ser. No. 16/881,219, to produce high quality, high bulk tissue paper. The inventive system and method have low installed capital costs and low operating costs, while also providing quality at levels beyond any other existing method.

In accordance with exemplary embodiments of the present invention, no fabric crepe, or pressing is required to force the fibers that make up the absorbent structure into the structured fabric, which can otherwise compact the web and destroy absorbency and softness. Further, in exemplary embodiments, the nascent web is nearly 99.5% water during initial drainage through the structured fabric. This highly viscous nascent web can therefore penetrate deeply into the structured fabric using the centripetal force from the forming roll to allow for high levels of total bulk generation with low coarseness structured fabrics. This preserves the smooth surface of the nascent web while still allowing for high levels of bulk generation, which improves softness and absorbency.

Exemplary embodiments of the present invention also provide for a low capital cost tissue papermaking-machine by enabling a smaller size machine, which requires a smaller building for housing the machine and less auxiliary equipment to operate compared to known tissue paper machines. For example, compared to a standard Advantage Thru-Air papermaking machine supplied by Valmet with a twin wire former, a thermal pre-drying (TAD) section with two 16 ft diameter TAD drums, a drying (Yankee) section with one 18 ft Yankee dryer, and a Dry End Section with calendars and an Advantage SoftReel B belted reel, the inventive paper machine requires up to 40% less space in the machine direction, as the space required by the twin wire former is effectively eliminated. This distance excludes any roll handling equipment downstream of the Reel Drum.

Figure 1:
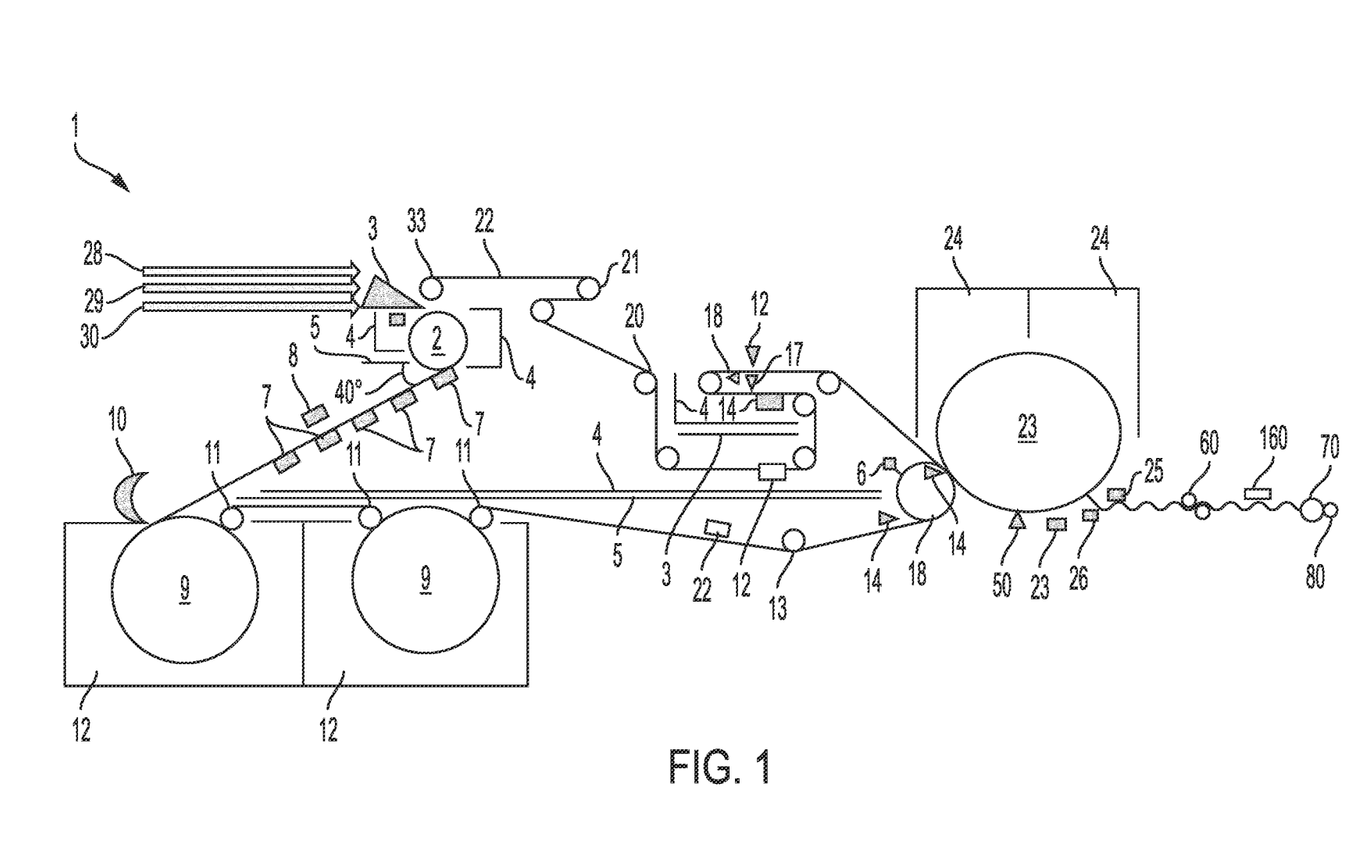
FIG. 1 is a representative diagram of a papermaking machine according to an exemplary embodiment of the present invention.

FIG. 1 is a representative diagram of a papermaking machine, generally designated by reference number 1, according to an exemplary embodiment of the present invention. As discussed in detail below, the papermaking machine 1 does not include a belt or fabric in the forming section of the machine other than a structured fabric belt.

Suitable structured fabric belts usable in exemplary embodiments of the present invention are described in U.S. Pat. No. 10,208,426 and U.S. patent application Ser. No. 16/881,219, the contents of which are hereby incorporated by reference in their entirety and may include a first layer that defines a web contacting surface, the first layer being made of extruded polymer made up of a plurality of first elements aligned in a first direction, a plurality of second elements aligned in a second direction and extending over the plurality of first elements, and a plurality of open portions defined by the plurality of first and second elements, and a second layer made of woven fabric that supports the first layer, where the first layer is bonded to the second layer so that the first layer extends only partially through the second layer and an interface formed between the first and second layers has airflow channels that extend in a machine direction and/or a cross direction within a plane parallel to the first and second layers Alternately, the first layer may be made by 3D printing of a polymeric material, as taught in U.S. Pat. No. 10,099,425, the contents of which are hereby incorporated by reference in their entirety. The geometry of the first layer provides quality attributes to the web as the first layer is the web contacting surface and thus the imprinting surface. A suitable design for the first layer that provides for a tissue product in accordance with exemplary embodiments of the present invention is described in Example 1 of U.S. Pat. No. 10,208,426. The woven second layer is preferably similar to conventional outer layer forming fabrics used on twin wire formers which may have multiple layers to increase fiber support, fiber retention, and drainage, such as the T-Star AJ-494 Forming Fabric provided by Asten Johnson (Asten Johnson Inc, North Charleston, S.C., USA). The second layer provides structural support for the first layer, aids in web drainage, and aids in fiber retention.

As shown in FIG. 1, the papermaking machine 1 includes a first exterior layer fan pump 28, a core layer fan pump 29, and a second exterior layer fan pump 30. The fan pumps 28, 29, 30 move a dilute slurry of fiber and chemicals to a triple layer headbox 3 which deposits the slurry into a nip formed by a forming roll 2, a structured fabric 22 and a breast roll 33. The structured fabric 22 may be a woven fabric with or without an overlaid polymer. In exemplary embodiments, the structured fabric 22 has a structure as described above. The forming roll 2 can be impermeable or permeable with an internal vacuum box and covered with a smooth or textured material such as, but not limited to, rubber or polyurethane. The cover of the forming roll 2 may also have a pattern of filaments made of metal or polymer to create a texture. The texture of the cover is intended to prevent fiber from sticking to the roll surface and follow the fabric surface after separation at a vacuum/transfer box 31.

The slurry is drained through the structured fabric 22 to form a web. The web properties at this point are a result of the selection and layering of fibers and chemistry along with the formation of the web, which influences strength development. The vacuum/transfer box 31 is used to assist in web adherence to the structured fabric 22 as it exits the forming roll nip. Excess water is doctored from the forming roll using one or more doctor blades 6a to minimize wringing of water from the roll and rewetting the web. A high-pressure shower prior to the doctor blade can be utilized to help remove any entrapped fiber. The web is conveyed across several dewatering boxes 7 to facilitate water removal. A steambox 8 is located above one of the vacuum boxes 7 to control cross direction moisture profile as measured by a traversing scanner 32. The angle of separation 40 of the structured fabric from the forming roll 2 can be as high as 90 degrees or as low as zero degrees, with a preferred angle of separation between 15 to 75 degrees to allow for any stock and water drips from the vacuum boxes 7 to be caught by containment pans to prevent them from contacting the tissue web, which might otherwise cause holes and sheet-breaks to occur on the paper machine. Containment pans 4 are located throughout the machine for catching water or stock. Additionally, steam heated pans 5 are located throughout the machine to help prevent any excess mist from condensing on the machine frame, causing stock and water buildup on the machine frame that lead to drips and holes in the tissue webs and subsequent sheet-breaks and lost operating time.

The web is conveyed on the structuring fabric 22 through a pre-drying section of the paper machine which may be TAD drums, infrared heaters, a belt press, or any known paper machine water removing device. In the exemplary embodiment shown in FIG. 1, the pre-drying sections shown are TAD drums 9 which use recirculating hot air impinged from hoods 12 through the web and TAD drums to remove moisture from the web. The air is reheated using a burner, preferably fired using natural gas, and recirculated back through the hoods 12 and TAD drums 9. Chrome rolls 11 are utilized to steady and direct the structured fabric 22 from the web contacting surface of the fabric. A vacuum hood 10 is also utilized to draw and remove air currents that contain paper dust and moisture away from the TAD drums 9 and hoods 12 where they can cause buildup and stock and water drips.

The web then travels across a bowed roll 13 to prevent wrinkling of the web and fabric 22, and then to a nip between press element 15, which in this case is a suction pressure roll, and steam heated pressure cylinder 23. Suitable press elements include but are not limited to an extended nip press such as a shoe press (e.g., Advantage™ ViscoNip® from Valmet, NipcoFlex® from Voith), a suction pressure roll with a cover made of rubber, polyurethane, or other material, with or without through drilled holes, blind drilled holes, grooves, or a combination thereof. The infeed nip to the press element 15 has a chemical shower 14 which applies a mineral oil or other lubricating chemical to the inside of the structured fabric 22. As the fabric 22 and web travel through the press nip, the lubricating chemical is forced through the fabric 22 into the web due to centripetal force and pressure to allow the web to release from the structured fabric onto the steam heated cylinder. The press element 15 may contain a through drilled cover with a stationary, sealed, and positively pressurized box 16, which induces air pressure onto the web via the through drilled holes to further aid in removal of the web from the structured fabric and to disrupt some fiber bonding, which in turn reduces the density of the web for improved absorbency and softness. The suction pressure roll preferably has a single, double, or triple doctor blade 6b to remove as much water as possible that could be held to the surface of the roll and which might otherwise rewet the fabric 22 or web. The steam heated cylinder 23 is coated with chemicals via a chemical shower or sprayboom 50 that improves web adhesion to the steam heated cylinder 23, improves heat transfer through the web, and assists in web removal at the creping doctor 26. The chemicals are constantly being applied by the chemical shower or sprayboom 50, while excess is being removed using a cleaning doctor blade 27. An additional "cut off" blade 25 is intermittently utilized to allow for blade changes for the creping and cleaning position. The web is dried by the steam heated cylinder 23 along with an installed hot air impingement hood 24 from a solids content of roughly 80% to a solids content of roughly 97.5%.

The web is removed from the steam heated cylinder 23 using a steel or ceramic doctor blade 26, preferably with a pocket angle of 90 degrees at the creping doctor. At this stage, the web properties are influenced by the creping action occurring at the creping doctor. A larger creping pocket angle will increase the frequency and fineness of the crepe bars imparted to the web's first exterior surface, which improves surface smoothness. The use of a ceramic doctor blade will also allow for a fine crepe bar pattern to be imparted to the web for a long duration of time compared to a steel or bimetal blade. The creping action imparted at the blade also improves web flexibility and is a result of the force imparted to the sheet at the crepe blade, and is improved as the web adherence to the dryer is increased. The creping force is primarily influenced by the chemistry applied to the steam heated cylinder, the % web contact with the cylinder surface, which is a result of the pattern of the structured fabric, and the percent web solids upon creping.

The web then optionally travels through a set of calenders 60 running, for example, 15% slower than the steam heated cylinder. The action of calendering improves sheet smoothness but results in lower bulk softness by reducing overall web thickness. The amount of calendering can be influenced by the attributes needed in the finished product. For example, a low sheet count, 2-ply, rolled sanitary tissue product will need less calendering than the same roll of 2-ply sanitary product at a higher sheet count and the same roll diameter and firmness. The thickness of the web may be reduced using calendering to allow for more sheets to fit on a roll of sanitary tissue, given limitations to roll diameter and firmness. After calendering, the web travels through a scanner 160 that measures cross direction basis weight and controls actuators inside the headbox to add dilution water to even out the basis weight profile. The web is reeled using a reel drum 70 into a parent roll 80.

The parent roll 70 can be converted into 1 or 2-ply rolled sanitary or towel products (e.g., bath tissue) or 1, 2, or 3 ply folded facial tissue products.

Instead of adhering the web to a steam heated cylinder, the web can be removed from the structured fabric 22 to directly proceed to the calendering section. Any variety of methods can be used to remove the web 22 from the structured fabric. For example, positive air pressure from the press element 15 may be used to transfer the sheet from the structured fabric 22 onto a vacuum roll. The vacuum roll contains a vacuum zone and a zone with positive air pressure used to release the sheet from the roll and allow it to proceed through the calendars. A tube threader system may be used to thread the sheet from this vacuum roll through the calenders and reel drum after a web break. A similar system may be used to thread after a break from the creping doctor when a steam heated cylinder is utilized.

To clean the structured fabric 22, traversing high pressure fan or needle showers 17 are utilized on the sheet side and roll side of the fabric 22 along with a high-volume flooding shower 18. Vacuum (uhle) boxes 19 on the sheet and roll side of the fabric 22 are then used to remove the excess water and any remaining fiber. A guide roll 20 is utilized to maintain the fabric in the proper cross direction position while stretch roll 21 is used to maintain the proper fabric tension.

In exemplary embodiments, the papermaking machine 1 has a total running length of about 33000 mm to about 37000 mm or about 35000 mm as opposed to conventional two TAD drum paper machines, which typically have total running lengths of approximately 48000 to 58000 mm. This distance excludes any roll handling equipment downstream of the Reel Drum. The papermaking process using the machine 1 is also more efficient in that there is no need for an additional belt or fabric in the forming process.

Figure 2:
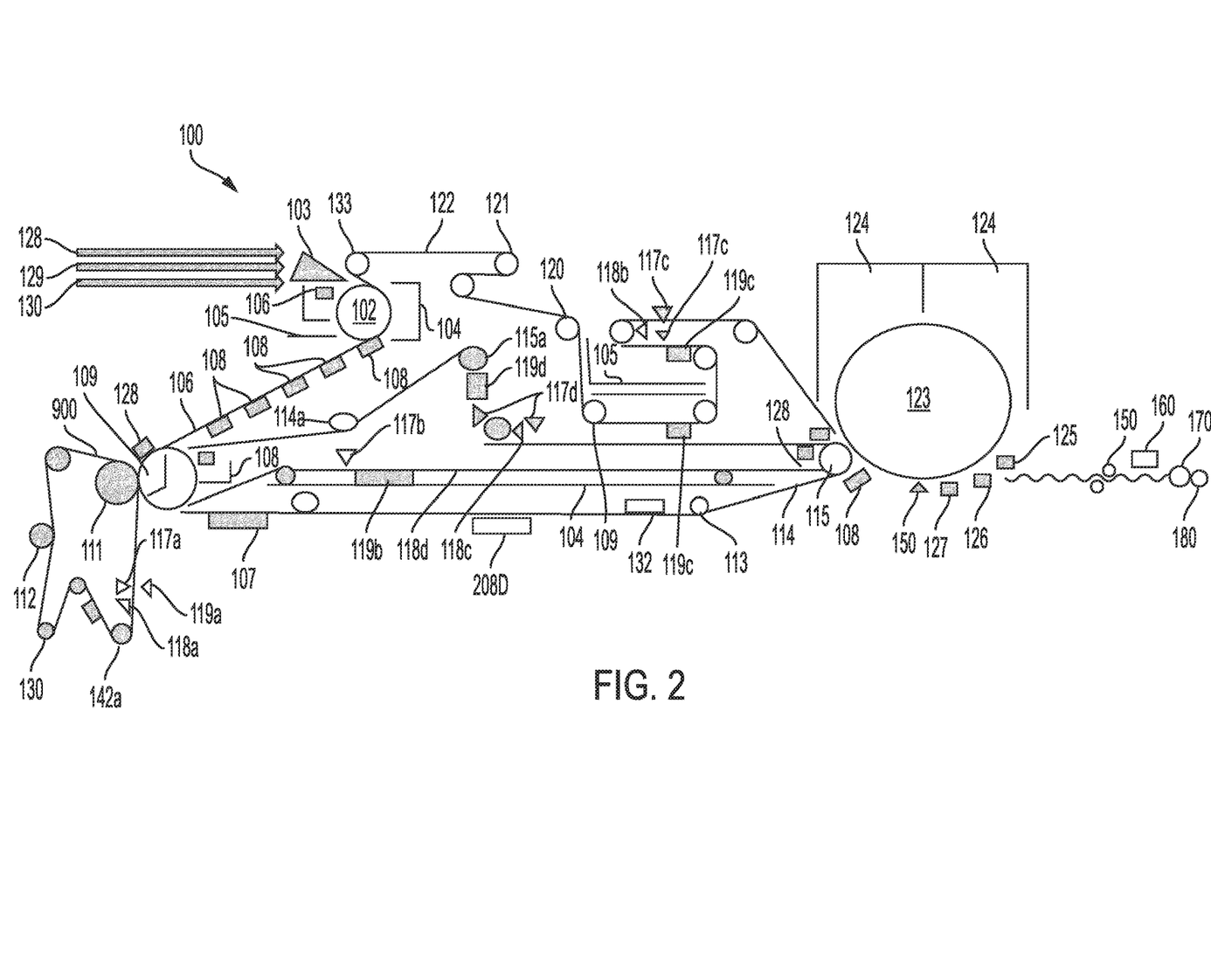
FIG. 2 is a representative diagram of a papermaking machine according to an exemplary embodiment of the present invention.

FIG. 2 is a representative diagram of a papermaking machine, generally designated by reference number 100, according to another exemplary embodiment of the present invention. As discussed in detail below, the papermaking machine 100 does not include a belt or fabric in the forming section of the machine other than a structured fabric belt.

A suitable structured fabric belt usable in exemplary embodiments of the present invention is described in U.S. Pat. No. 10,208,426, the contents of which are hereby incorporated by reference in their entirety, and may include a first layer (web supporting layer) made of extruded polymer netting, an overlaid hardened resin, welded strips of polymer or extruded polymer sheets which are etched by punching, drilling, or laser drilling. For example, the structured fabric belt may include a first layer that defines a web contacting surface, the first layer being made of extruded polymer with a plurality of first elements aligned in a first direction, a plurality of second elements aligned in a second direction and extending over the plurality of first elements, and a plurality of open portions defined by the plurality of first and second elements, and a second layer made of woven fabric that supports the first layer, where the first layer is bonded to the second layer so that the first layer extends only partially through the second layer and an interface formed between the first and second layers has airflow channels that extend in a machine direction and/or a cross direction within a plane parallel to the first and second layers. Alternately, the first layer may be made by 3D printing of a polymeric material, as taught in U.S. Pat. No. 10,099,425, the contents of which are hereby incorporated by reference in their entirety. The geometry of the first layer provides quality attributes to the web as the first layer is the web contacting surface and thus the imprinting surface. A suitable design for the first layer that provides for a tissue product in accordance with exemplary embodiments of the present invention is described in Example 1 of U.S. Pat. No. 10,208,426. The woven second layer is preferably similar to conventional outer layer forming fabrics used on twin wire formers which may have multiple layers to increase fiber support, fiber retention, and drainage, such as the T-Star AJ-494 Forming Fabric provided by Asten Johnson (Asten Johnson Inc, North Charleston, S.C., USA). The second layer provides structural support for the first layer, aids in web drainage, and aids in fiber retention.

The papermaking machine 100 includes a first exterior layer fan pump 128, a core layer fan pump 129, and a second exterior layer fan pump 130. The fan pumps 128, 129, 130 move a dilute slurry of fiber and chemicals to a triple layer headbox 103 which deposits the slurry into a nip formed by a forming roll 102 a structured fabric 122, and a breast roll (133). The structured fabric 122 may be a woven fabric with or without an overlaid polymer. In exemplary embodiments, the structured fabric 122 has a structure as described above. The forming roll 102 can be impermeable or permeable with an internal vacuum box and covered with a smooth or textured material not limited to rubber or polyurethane. The cover of the forming roll 102 may also have a pattern of filaments made of metal or polymer to create a texture. The texture of the cover is intended to prevent fiber from sticking to the roll surface and follow the fabric surface after separation at a vacuum transfer box 131.

The slurry is drained through the structured fabric 122 to form a web. The web properties at this point are a result of the selection and layering of fibers and chemistry along with the formation of the web which influences strength development. Excess water is doctored from the forming roll using a single, double, or triple doctor blade 106 to minimize wringing of water from the roll and rewetting the web. A high-pressure shower prior to the doctor blade can be utilized to help remove any entrapped fiber. The vacuum (transfer) box 131 is used to assist in web adherence to the structured fabric 122 as the web exits the forming roll nip. The web is conveyed across several dewatering boxes 107 to facilitate water removal. The angle of separation 140 of the structured fabric 122 from the forming roll 102 can be as high as 90 degrees or as low as zero degrees, with a preferred angle of separation between 15 to 75 degrees to allow for any stock and water drips from the vacuum boxes 107 to be caught by containment pans and prevented from contacting the tissue web, which might otherwise cause holes and sheetbreaks to occur on the paper machine. Containment pans 104 are located throughout the machine 100 for catching water or stock. Additionally, steam heated pans 105 are located throughout the machine 100 to help prevent any excess mist from condensing on the machine frame, causing stock and water buildup on the machine frame that lead to drips and holes in the tissue webs and subsequent sheetbreaks and lost operating time.

A steambox 108 is located above a first press element 110, such as a suction pressure roll with a cover made of rubber, polyurethane, or other material with or without through drilled holes, blind drilled holes, grooves, or a combination thereof. The first press element 110 is nipped to a second press element 111, which may be, for example, a conventional plain press roll or extended nip press roll such as a shoe press or belt press. It should be noted that press elements 110, 111, 115 can be any type of press element in common use in the paper industry such as a conventional plain press roll with a narrow nip width and high nip intensity with a flat, grooved, or blind drilled surface, or a capillary dewatering roll (as disclosed in U.S. Pat. No. 5,701,682, the contents of which are hereby incorporated by reference in their entirety). However, extended nip presses using lower pressure and longer dwell time are preferred in order to preserve the bulk of the tissue web, such as shoe presses including NipcoFlex® from Voith or the Advantage™ ViscoNip® from Valmet. In the case of a shoe press, the sleeve of the shoe press may be plain, grooved, blind drilled, through drilled, or a combination thereof. Dewatering fabrics 900 and 1100 wrap above and below the structuring fabric 122 that conveys the web between rolls 110 and 111. The dewatering fabrics 900, 1100 may be made of large monofilaments or multi-filamentous yarns, needled with fine synthetic batt fibers to form a smooth surface for even web pressing. However, any type of dewatering fabrics can be used, such as, for example, the fabric shown in FIG. 14 of U.S. Pat. No. 7,476,294, which incorporates other absorbent porous materials. The dewatering fabrics may contain materials such as extruded polymer netting for compression resistance.

Vacuum is also applied in zone 109 by an internal vacuum box of the press element 110 with a steambox 108 located above the vacuum box to lower the viscosity of the water to enhance water removal. Water is drawn into the dewatering fabrics 900, 1100 as the structuring fabric 122 and web pass through this nip by the vacuum applied by the press element 110 and the compression and expansion of the dewatering fabrics in the nip. Water drawn into the dewatering fabrics is later removed using vacuum boxes usually referred to as uhle boxes. Excess water pulled through dewatering fabric 1100 from roll 110 is caught in a pan 105. The press element 110 preferably has a single, double, or triple doctor blade 106 to remove as much water as possible that might otherwise be held to the surface of the roll and rewet the fabrics or web.

Dewatering fabric 900 is cleaned by high pressure needle or fan showers 117a and by flooding shower 118a and then dewatered using a uhle box 119a. Guide roll 112 keeps the fabric 900 from moving in the cross-machine direction and stretch roll 1130 maintains proper fabric tension.

Dewatering fabric 1100 separates after roll 110 to be cleaned by a high-pressure needle or fan shower 117b and dewatered using a uhle box 119b. The uhle box 119b can have a steam shower blowing into the fabric over the uhle box 119b to decrease the viscosity of the water and aid in dewatering. Dewatering fabric 1100 then travels through a second press nip between press element 115 and a steam heated cylinder 123.

Structuring fabric 122 with the paper web, since exiting the first press nip, has traveled across another dewatering box 107 to improve dryness and remove any water that may sling off dewatering fabric 1100. The structuring fabric 122 then travels across a scanner 132 which measures cross direction machine moisture and controls steam box 108 located below press element 115, which in this case is a suction pressure roll. The steambox 108 has zones to control the amount of steam applied in the cross direction to help maintain a uniform cross direction machine moisture profile. After the scanner 132, the structuring fabric 122 travels across a bowed roll 113 to help spread the fabric 122 in the cross direction and prevent wrinkles.

The structuring fabric 122 then again comes into contact with dewatering fabric 1100 at press element 115. Water is drawn into the dewatering fabric 1100 as the structuring fabric 122 and web pass through this nip by the vacuum applied by the press element 115 and the compression and expansion of the dewatering fabric 1100 in the nip. Water drawn into the dewatering fabric 1100 is later removed using vacuum boxes usually referred to as uhle boxes. Excess water pulled through dewatering fabric 1100 from press element 115 is caught in a pan 105. The press element 115 preferably has a single, double, or triple doctor blade 106 to remove as much water as possible that could be held to the surface of the roll and rewet the fabrics or web. The infeed nip to the press element 115 has a chemical shower 114 which applies a mineral oil or other lubricating chemical to the inside of the structured fabric 122. As the fabric and web travel through the press nip, the lubricating chemical is forced through the fabric 122 into the web due to centripetal force and pressure to allow the web to release from the structured fabric 122 onto the steam heated cylinder 123. The dewatering fabric 1100 exits the press nip and is cleaned by high pressure needle or fan showers 117d and flooding shower 118c and dewatered by uhle box 119. Roll 1150 is the stretch roll while roll 1140 is the guide roll.

The steam heated cylinder 123 is coated with chemicals via a chemical shower 150 that improves web adhesion to the steam heated cylinder, improves heat transfer through the web, and assists in web removal at the creping doctor 126. The chemicals are constantly applied by the chemical shower or sprayboom 150, while excess is removed using a cleaning doctor blade 127. An additional "cut off" blade 125 is intermittently utilized to allow for blade changes for the creping and cleaning position. The web is dried by the steam heated cylinder 123 along with an installed hot air impingement hood 124 from a solids content of, for example, roughly 60% to a solids content of, for example, roughly 97.5%.

The web is removed from the steam heated cylinder 123 using a steel or ceramic doctor blade 126, preferably with a pocket angle of 90 degrees at the creping doctor. At this stage, the web properties are influenced by the creping action occurring at the creping doctor. A larger creping pocket angle will increase the frequency and fineness of the crepe bars imparted to the web's first exterior surface, which improves surface smoothness. The use of a ceramic doctor blade will also allow for a fine crepe bar pattern to be imparted to the web for a long duration of time compared to a steel or bimetal blade. The creping action imparted at the blade also improves web flexibility and is a result of the force imparted to the sheet at the crepe blade, and is improved as the web adherence to the dryer is increased. The creping force is primarily influenced by the chemistry applied to the steam heated cylinder, the % web contact with the cylinder surface, which is a result of the pattern of the structured fabric, and the percent web solids upon creping.

The web then optionally travels through a set of calenders 160 running, for example, 15% slower than the steam heated cylinder. The action of calendering improves sheet smoothness but results in lower bulk softness by reducing overall web thickness. The amount of calendering can be influenced by the attributes needed in the finished product. For example, a low sheet count, 2-ply, rolled sanitary tissue product will need less calendering than the same roll of 2-ply sanitary product at a higher sheet count and the same roll diameter and firmness. The thickness of the web may be reduced using calendering to allow for more sheets to fit on a roll of sanitary tissue, given limitations to roll diameter and firmness. After calendering, the web travels through a scanner that measures cross direction basis weight and controls actuators inside the headbox to control dilution water to even out the basis weight profile. The web is then reeled using a reel drum 170 into a parent roll 180.

The parent roll 180 can be converted into 1 or 2-ply rolled sanitary or towel products (e.g., bath tissue) or 1, 2, or 3 ply folded facial tissue products.

Instead of adhering the web to a steam heated cylinder, the web can be removed from the structured fabric 122 to directly proceed to the calendering section. Any variety of methods can be used to remove the web from the structured fabric. For example, positive air pressure from the pressure element 115 may be used to transfer the sheet from the structured fabric 122 onto a vacuum roll. The vacuum roll contains a vacuum zone and a zone with positive air pressure used to release the sheet from the roll and allow it to proceed through the calenders. A tube threader system may be used to thread the sheet from this vacuum roll through the calenders and reel drum after a web break. A similar system may be used to thread after a break from the creping doctor when a steam heated cylinder is utilized.

To clean the structured fabric 122, traversing high pressure fan or needle showers 117c are utilized on the sheet side and roll side of the fabric 122 along with a high-volume flooding shower 118b. Vacuum boxes 119c on the sheet and roll side of the fabric 122 are then used to remove the excess water and any remaining fiber. A guide roll 120 is utilized to maintain the fabric 122 in the proper cross direction position while stretch roll 121 is used to maintain the proper fabric tension.

In exemplary embodiments, papermaking machine 100 has a total running length of about 33000 mm to about 37000 mm, or approximately 35000 mm, as opposed to typical two TAD drum paper machines, which typically have total running lengths of approximately 48000 to 58000 mm. This distance excludes any roll handling equipment downstream of the Reel Drum. The papermaking process using the machine 100 is also more efficient in that there is no need for an additional fabric in the forming process.

In exemplary embodiments, the dewatering fabric 1100 is shortened such that it does not wrap the press section made up of press element 115 and steam heated cylinder 123. In another exemplary embodiment, the first press section may not include the dewatering fabric 1100, in which case a boost dryer such as an infrared dryer 2000 may be installed after the first press section. In this case, the press element 115 may be similar to the press element used in the first-described exemplary embodiment.

It should be appreciated that various modifications may be made to the exemplary embodiments described herein. For example, rather than a triple layer headbox, a single or double layer headbox can be used and/or a belted reel section may be used in place of a reel drum and/or creping pockets with an angle different than 90 degrees may be used. Further, in the first-described exemplary embodiment (FIG. 1), a single TAD drum may be used instead of two TAD drums.

The use of a single fabric throughout the papermaking machine to carry out the papermaking processes as described herein allows for the machine to be non-cantilevered. In this regard, the conventional process for changing a press felt involves removal of the spacers on the press roller and/or operating side of the frame and supporting the press roller by means of cantilever girders from the driving side to produce a gap into which the felt can be inserted. After this, the endless felt is spread out on the floor on the operating side, from where it is then lifted onto the press using suitable lifting apparatus while at the same time its lower part is being fed into the gap thus opened. Once the felt has been passed into position and straightened, the spacers are mounted again and the felt is tightened in position. In contrast, in accordance with exemplary embodiments of the present invention, the structured tissue belt is multi-layered and includes a "pin" seam which allows for seaming the fabric on the machine.

Figure 3:
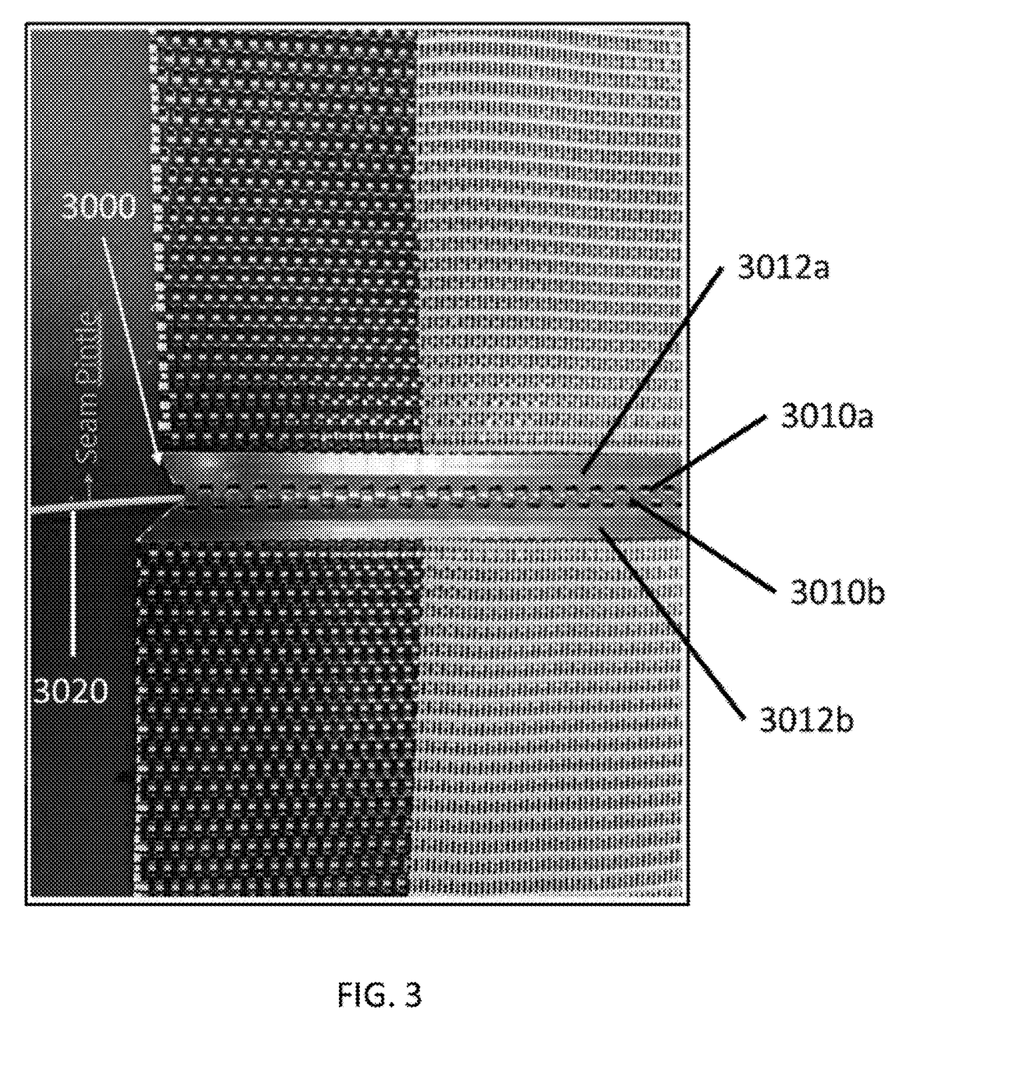
FIG. 3 is a photograph showing a pin seam according to an exemplary embodiment of the present invention.

FIG. 3 shows a pin seam, generally designated by reference number 3000, according to an exemplary embodiment of the present invention. The pin seam 3000 is made up of a plurality of first loops 3010a arranged along one end of the belt and a plurality of second loops 3010b arranged along the opposite end of the belt. The loops 3010a, 3010b extend from strips of material 3012a, 3012b that are welded or otherwise fastened to the ends of the base fabric of the belt. In exemplary embodiments, the loops 3010a form a unitary structure with the strip of material 3012a and the loops 3010b form a unitary structure with the strip of material 3012b. The loops 3010a, 3010b are arranged along their respective ends so that they interlock with one another when the ends are aligned. The interlocking of the loops 3010a, 3010b results in a continuous passage or opening through the extent of the seam. As shown in FIG. 3, a pintle or solid "pin" 3020 is threaded through the passage formed by the interlocking loops 3010a, 3010b. Although now shown, a second pintle may be inserted into the passage at the opposite side of the belt and threaded through. The pintle 3020 holds the ends of the belt together. In exemplary embodiments, the structured fabric is installed on the papermaking machine with the ends unattached, and then the pintle is threaded through the loops to lock the ends together.

Without being bound by theory, it is believed that the non-cantilevered roll processes can be run at higher speeds with less vibration and with less material needed to stabilize the structural units as compared to cantilevered machines. Thus, exemplary embodiments of the present invention provide significant advantages, including, for example, significant reduction in the capital cost for the machine, significant increase maximum in operating rates, and reduction of material cost and required operating rate.

Now that embodiments of the present invention have been shown and described in detail, various modifications and improvements thereon will become readily apparent to those skilled in the art. Accordingly, the spirit and scope of the present invention is to be construed broadly and not limited by the foregoing specification.

What is claimed is:

1. A papermaking machine comprising:
    a forming section configured to form a nascent fibrous web, the forming section comprising a nip formed between two rolls comprising a forming roll and a single fabric that is a structured fabric that wraps around the two rolls, the structured fabric configured to receive a fiber slurry deposited from a headbox so as to form the nascent web;
    a first drying section into which the nascent web travels on the structured fabric after separation of the structured fabric from the forming roll; and
    a dry end section after the first drying section through which the nascent web travels after being transferred from the structured fabric,
    wherein the papermaking machine is devoid of any belts or fabrics other than the structured fabric.

2. The papermaking machine of claim 1, further comprising a second drying section to which the nascent web travels on the structured fabric prior to transferring of the nascent web to the dry end section.

3. The papermaking machine of claim 1, wherein the structured fabric comprises a woven fabric, a woven fabric with an overlaid polymer, welded strips of polymeric material or extruded sheets of polymer which are etched by punching, drilling, or laser drilling, woven fabrics laminated with a 3-D printed web contacting or structuring layer, a structured fabric made entirely from 3-D printed material, a laminated structured fabric with a web-contacting layer made from extruded polymer netting or 3-D printed material laminated to a woven fabric or dewatering fabric.

4. The papermaking machine of claim 1, wherein the structured fabric comprises a laminated fabric that comprises:
a web contacting layer made from extruded polymer netting or 3-D printed material; and
a non-web contacting layer made of a woven fabric.

5. The papermaking machine of claim 1, wherein the headbox is a single, double, or triple layer headbox.

6. The papermaking machine of claim 5, wherein the headbox comprises dilution water actuators for controlling cross machine direction basis weight.

7. The papermaking machine of claim 1, wherein the two rolls comprise a forming roll and a breast roll, and the forming roll is impermeable or permeable with an internal vacuum box comprised of a smooth or textured roll cover made of a material selected from the group consisting of rubber, polyurethane, filaments made of metal or polymer, or combinations thereof.

8. The papermaking machine of claim 1, wherein the first drying section comprises one or more vacuum dewatering boxes, one or more vacuum dewatering shoes, one or more steamboxes, one or more TAD drums with hot air impingement hoods, or combinations thereof.

9. The papermaking machine of claim 1, wherein the first drying section comprises a scanner to measure cross direction web moisture and control profiling actuators of the steambox.

10. The papermaking machine of claim 1, wherein the first drying section comprises a press element.

11. The papermaking machine of claim 1, wherein the first drying section comprises a vacuum roll disposed at a web contacting surface of the structuring fabric that conveys the web to the dry end section.

12. The papermaking machine of claim 1, wherein the first drying section comprises a suction pressure roll, and the suction pressure roll comprises a roll cover made of a polymeric material and the roll cover is grooved, blind drilled, through drilled, or a combination thereof.

13. The papermaking machine of claim 1, wherein the first drying section comprises a shoe press, and the shoe press comprises a sleeve made of a polymeric material and the sleeve is grooved, blind drilled, through drilled, or a combination thereof.

14. The papermaking machine of claim 10, wherein the first drying section comprises a chemical shower at an infeed nip of the press element for applying a chemical to aid in paper web transfer to the steam heated cylinder.

15. The papermaking machine of claim 2, wherein the drying section comprises a steam heated cylinder and creping doctor with or without a hot air impingement hood.

16. The papermaking machine of claim 1, wherein the dry end section comprises calenders, a scanner, and a reeling device.

17. The papermaking machine of claim 16, wherein the scanner measures cross direction machine basis weight profile and controls dilution actuators of the headbox for an even basis weight profile.

* * * * *